Patented Oct. 13, 1936

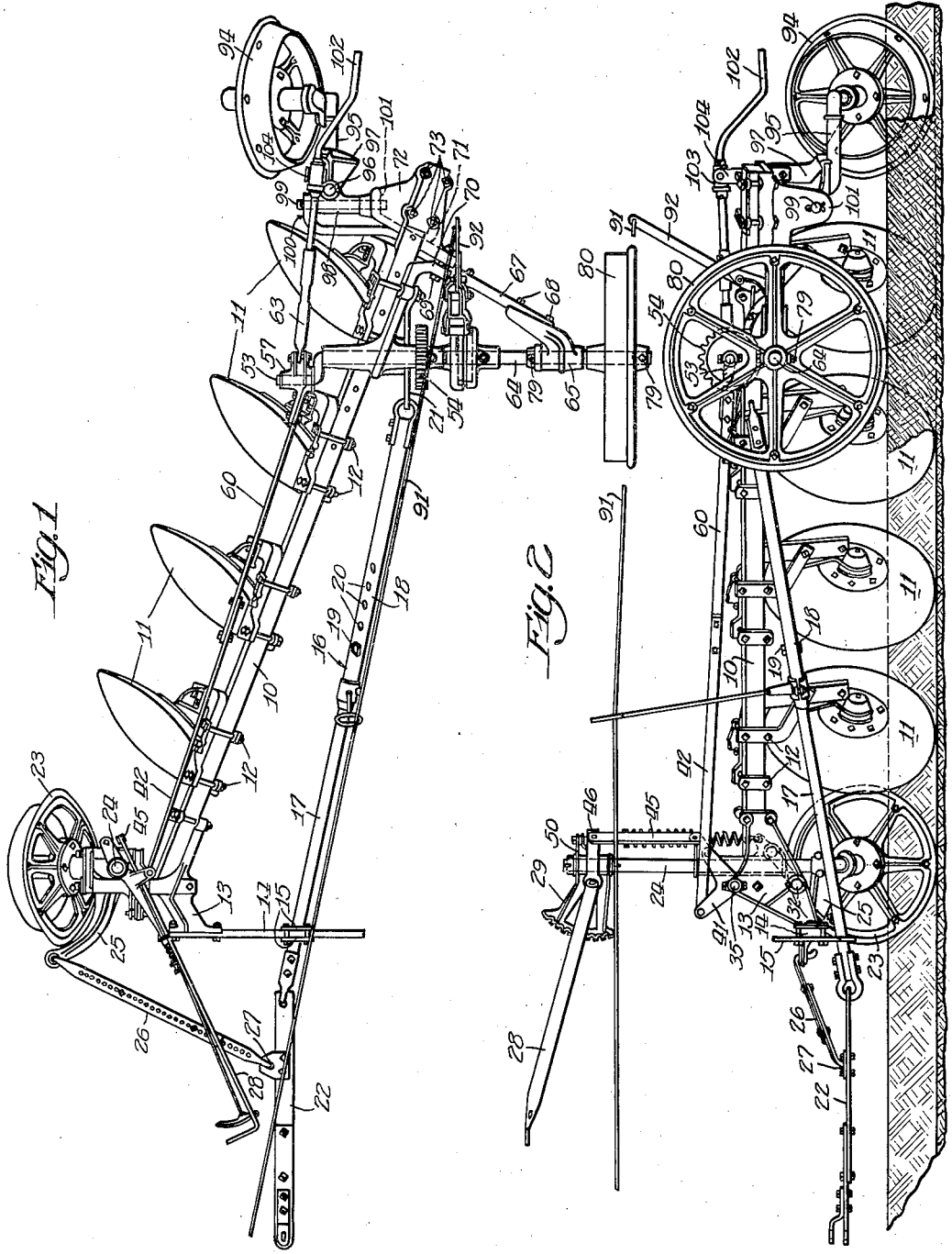

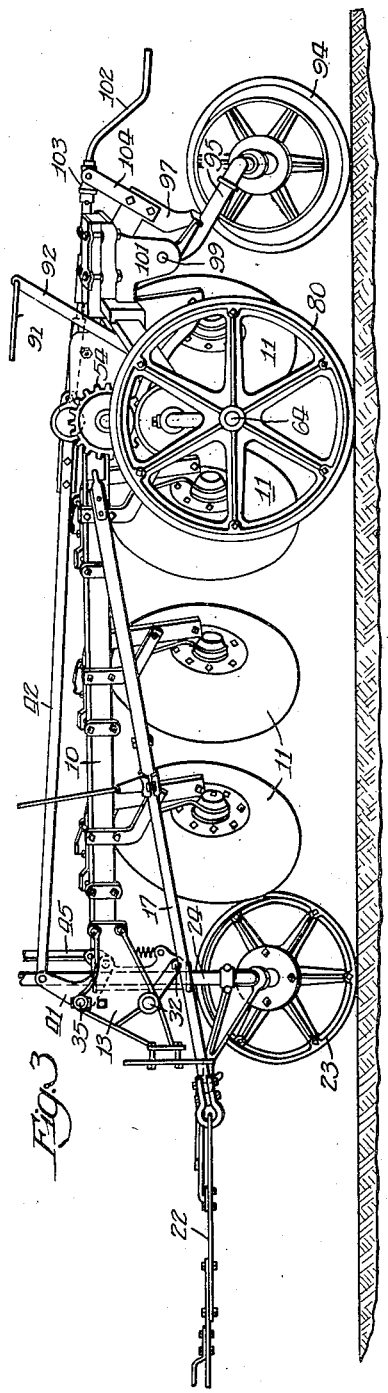
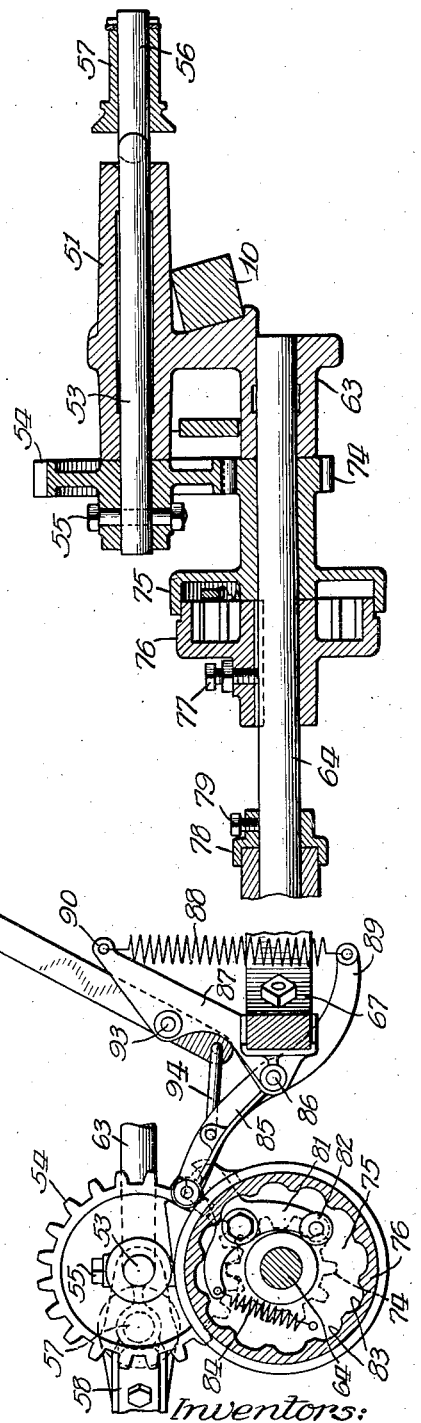

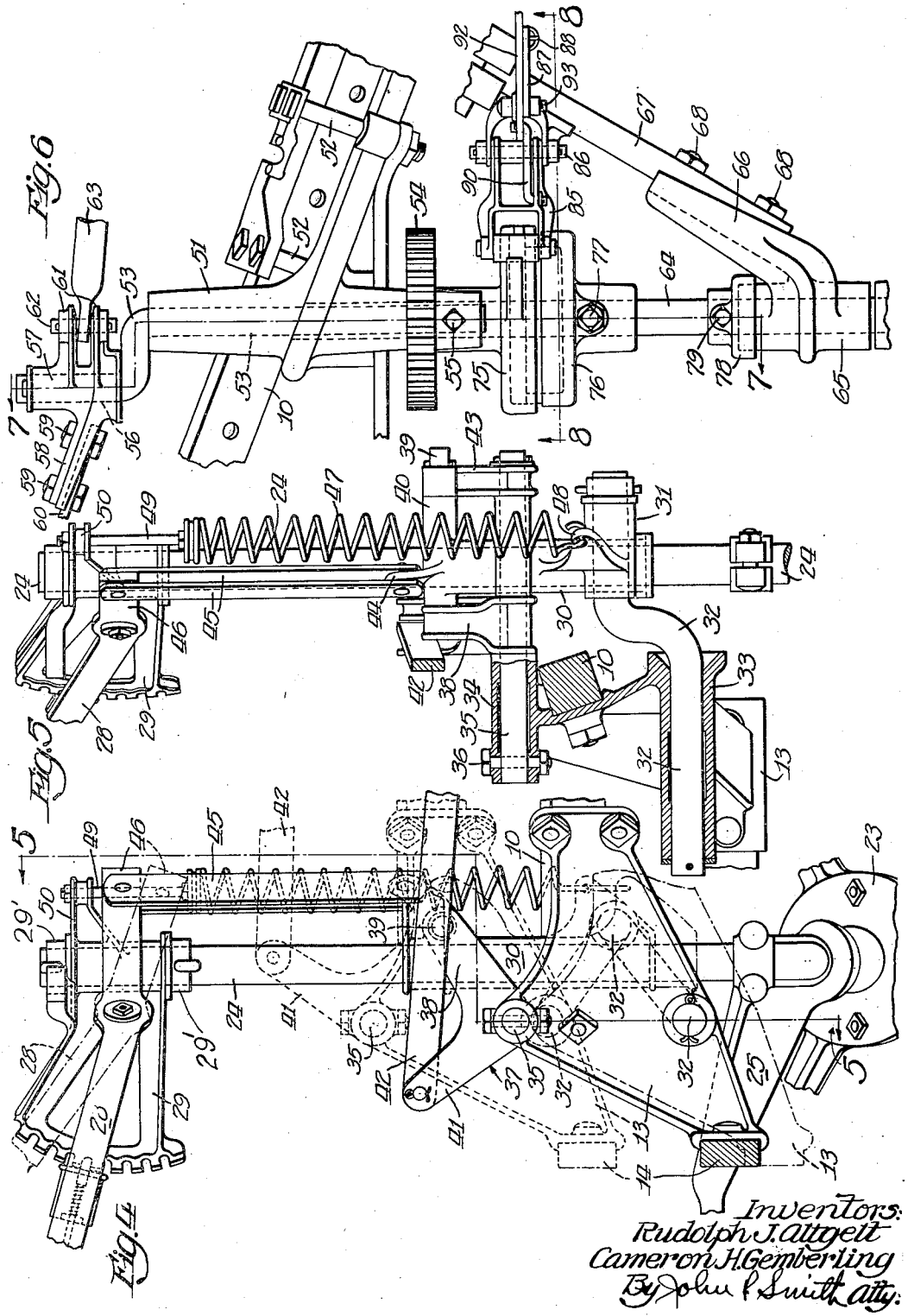

2,057,080

UNITED STATES PATENT OFFICE 2,057,080

DISK PLOW

Rudolph J. Altgelt and Cameron H. Gemberling, South Bend, Ind., assignors to Oliver Farm Equipment Company, a corporation of Delaware Application April 17, 1933, Serial No. 666,454
Renewed September 9, 1935

20 Claims. (Cl. 97—72)

The present invention relates generally to disk plows but more particularly to an overhead beam disk plow.

The primary object of the present invention is to provide a novel and improved construction of disk plow of the overhead beam type in which the axle of the power lift land wheel revolves continuously with the movement of the plow across the field.

A further object of the invention is to provide a novel plow construction in which relatively spaced apart bearings are provided for the revolving power lift axle so as to make the entire structure of the plow more rigid and minimizes the effect of play when the plow becomes old.

A further object of the invention is to provide a novel and improved disk plow in which the power lift clutch is moved away from the land wheel and inwardly therefrom, between the two bearings of the land wheel axle so as to prevent dust and grit, which is constantly raised by the land wheel while plowing, from dropping into the clutch mechanism as now occurs with the present type of clutch mechanism attached directly to the land wheel.

A further object of the invention is to provide a novel disk plow in which the power lift land wheel thereof is bolted rigidly to the axle thereof and revolves constantly while the plow is in motion.

A still further object of the invention is to provide a novel and improved disk plow in which one of the furrow wheels is raised and lowered in relation to the frame of the plow by means of a parallel link mechanism.

These and other objects are accomplished by providing a construction and arrangement of the various parts in the manner hereinafter described and particularly pointed out in the appended claims.

Referring to the drawings:

Fig. 1 is a top plan view of an overhead beam disk plow having our improvement embodied therein;

Fig. 2 is a side elevational view of the plow showing the disks thereof lowered into the ground or in their operative positions;

Fig. 3 is a similar side elevational view with the disks raised out of the ground for transporting the plow;

Fig. 4 is an enlarged detailed view showing the mechanism for adjusting the front furrow wheel and the parallel link arrangement for lifting the front end of the plow frame by the power lift mechanism;

Fig. 5 is an enlarged cross sectional view taken on the line 5—5 in Fig. 4;

Fig. 6 is an enlarged detailed and top plan view of the power lift mechanism and its associated parts;

Fig. 7 is a cross sectional view taken on the line 7—7 in Fig. 6 and

Fig. 8 is a cross sectional view taken on the line 8—8 in Fig. 6.

Referring to the drawings, we have illustrated one form of our invention in connection with an overhead beam type of plow which comprises a general frame structure including a diagonally disposed plow beam, generally indicated by the reference character 10, to which are adjustably clamped four spaced apart disks 11. These disks 11 are slidable longitudinally of the beam 10 and rigidly clamped thereto by means of clamping members, generally indicated by the reference character 12, so that the spacing of these disks with respect to each other may be secured without entirely removing the clamping members and disks from the beam. Secured to the forward end of the beam 10 is a frame bracket 13. Secured to the forward side of the bracket 13 is a transversely extending bar 14. Adjustably clamped to the bar 14 for lateral and vertical adjustment with respect thereto, is a draft bar support 15. Extending through an aperture in the lower end of this draft bar support 15 is a telescopically adjustable draft member, generally indicated by the reference character 16, which comprises a forward member 17 and rearward member 18. This draft member may be telescopically and adjustably connected for various lengths and secured in these various lengths by means of a bolt 19. The bolt 19 is adapted to be inserted in various apertures 20 of the member 18 and through an aperture in the rearward end of the member 17 for varying the length of this draft member. The rear end of this draft member 16 is connected by a strap 21 to the rear end of the beam 10, while the forward end of the draft member 16 is pivotally connected to the main draft member 22 which in turn, connects the plow to the draft bar of the tractor. Supporting the front end of the plow is a front furrow wheel 23 which is dirigibly mounted on an angular crank standard or axle 24. Secured to this crank axle 24 adjacent the bend thereof is a forwardly projecting steering arm 25 to the free end of which is connected an adjustable connecting bar 26, which in turn is connected, as shown at 27, to the main draft member 22 for guiding the plow by the action of the draft member 22. The depth penetration of the disks on the front end of the plow frame are controlled from the operator's seat on the tractor by means of a hand operating lever 28 which is pivoted to a sector 29 loosely mounted between two collars 29' on the upper end of the vertical portion of the axle 24.

One of the important features of the present invention involves the raising and lowering mechanism in combination with the power lift through the action of the parallel link mechanism. This arrangement provides a more easily operated raising and lowering mechanism over the conventional form of sliding sleeve heretofore used, in that the parallel link mechanism requires less power to lift, due to the fact that it is not apt to become jammed or difficult to move on account of sand or dirt. In this connection our improved type of lift for the front end of the plow comprises a vertically adjustable sliding sleeve 30 which is mounted on the vertical portions of the axle 24. Formed integrally with the lower portion of the sleeve 30 is a bearing barrel 31 in which is journaled one end of a crank shaft 32. The other end of this crank shaft is journaled in the bearing barrel 33 formed integrally with the bracket 13. Formed integrally with the bracket 13 and spaced vertically above and parallel with the bearing barrel 33 is a socket 34 in which a shaft 35 is secured therein by a bolt 36. Pivotally mounted on the shaft 35, between the socket 34 and the sleeve 30, is a bell crank, generally indicated by the reference character 37. One arm of this bell-crank, as indicated at 38, is pivotally connected to a shaft 39 secured in a barrel 40. The barrel 40 is formed integrally with the sleeve 30 adjacent the top thereof. This bell-crank 37 is provided with a forwardly extending arm 41, to the outer free end of which is connected an adjustable connecting bar 42, which in turn, has its rear end connected to the power lift mechanism in the manner hereinafter described. Located on the other side of the sleeve 30 and extending parallel with the arm or link 38 of the bell-crank 37, is a second link 43 which pivotally connects the shaft 39 to the shaft 35, as clearly shown in Fig. 5 of the drawings. Formed on the upper end of the sleeve 30 is an ear 44 which is pivotally connected by a pair of links 45 to the rear end 46 of the hand operating lever 28 for adjusting the depth penetration of the disks on the front end of the plow. Part of the weight of the front end of the plow is balanced by an extension spring 47 which has one end connected to an ear 48 formed integrally with the sleeve 30, and the other end is adjustably connected by means of a bolt 49 to an arm 50 formed integrally with the sector 29. From this construction, it will be readily seen that as the lever 28 is adjusted from its full line position, shown in Fig. 4, to the dotted line position, the rear end of the lever is lowered, thereby lowering the links 45 and with it the sleeve 30. The lowering of the sleeve 30, bodily lowers the parallel link arrangement and with it the bracket 13 to the dotted line position shown in this figure, consequently lowering the depth penetration of the disks on the front end of the plow.

Another feature of our invention includes the arrangement which permits securing of the land wheel or power lift wheel rigidly to the land wheel axle and supporting of the land wheel axle in two spaced apart bearings. Another novel arrangement of our invention includes the positioning of the clutch or power lift mechanism between two spaced apart bearings and away from the land wheel so as to be out of position and away from the dirt and sand ordinarily raised by the land wheel in the movement of the plow. This arrangement includes an adjustable bearing bracket 51 adjustably secured at a point near the rear portion of the diagonal disk beam 10 by means of bolts 52. Journaled in this bearing bracket 51 is a crank shaft 53 which has secured at one end thereof, a spur gear 54 by means of a bolt 55. The other end of the crank shaft 53 is provided with a crank arm 56 on which is journaled a driving sleeve 57. The sleeve 57 is provided with a forwardly projecting and angularly disposed ear 58 to which is connected by means of bolts 59a connecting bar 60. The forward end of the bar 60 is connected to the connecting bar 42 for controlling the raising and lowering action of the front end of the plow. The sleeve 57 is provided with two spaced apart rearwardly extending ears 61 between which is pivotally connected, by means of a pin 62, a rearwardly extending adjustable connection 63 for controlling the raising and lowering of the rear furrow wheel with respect to the plow frame, in the manner hereinafter described. Formed integrally with and spaced vertically below the bearing bracket 51, is a bearing barrel 63, in which one end of a land wheel axle 64 is journaled. The other end of the land wheel axle is journaled in a bearing bracket 65. Formed integrally with the bearing 65 is a rearwardly and angularly disposed socket 66 in which a diagonal brace 67 is secured by means of bolts 68. The intermediate portion of the diagonal brace 67 is secured by means of bolts 69 between an angularly disposed ear 70 of the bearing bracket 51 and a flange 71 of a bracket 72. The bracket 72 is secured to the rearmost end of the beam 10 by means of bolts 73. Journaled on the land wheel axle 64, at a point adjacent the gear 54, is a pinion 74, which meshes with and operatively drives the gear 54. Formed integrally with the pinion 74 is an intermittently driven clutch member 75 which cooperates with a continuously driven clutch member 76 keyed to the axle 64. The clutch member 76 is further secured to the axle by means of a set screw 77. The axle 64 is prevented from displacement with respect to the two bearings by means of a collar 78 which engages the inner end of the bearing 65 and is secured to the axle by means of a set screw 79. Rigidly secured to the outer end of the land wheel axle 64 by means of a bolt 79 is a land wheel 80. The clutch mechanism employed in connection with our improved type of plow is of the conventional form and briefly includes a clutch pawl, generally indicated by the reference character 81 which is pivoted to the intermittently rotating clutch member 75 and is provided with a roller 82 which engages the notches 83 of the continuously rotating clutch member 76. The pawl is actuated in a direction to force the roller to engage the continuously rotating clutch member by spring 84. The pawl is disengaged from its notches in the continuously driven clutch member 76 by a lever 85 which has its intermediate portions pivoted, as shown at 86, to a bracket 87 secured to the diagonal brace member 67. The lever 85 is actuated to engage the pawl by a spring 88 which has one end thereof connected to a rearwardly extending arm 89 of the lever 85 and the other end thereof connected, as shown at 90, to an upwardly extending arm of the bracket 87. The clutch mechanism is operatively controlled for raising or lowering the plow by a control rope 91 which extends from the operator's seat on the tractor and is connected to a trip lever 92, which in turn, is pivoted at 93, to the bracket 87. The lower end of the lever 92 is connected by means of a link 94 to the lever 85.

Obviously when the cord or rope 94 is pulled forwardly so as to actuate the trip lever 92, the lever 85 becomes disengaged from the pawl 81 permitting the continuously driven clutch member to become operatively engaged with its intermittently driven clutch member and thereby rotate or drive the pinion 74 which in turn, drives the gear 54 to operate the crank shaft 53 for raising the plow or particularly the plow frame with respect to the front and rear furrow wheels.

The rear furrow wheel 94 is journaled on an angularly disposed axle 95 which in turn is provided with a vertically extending portion, as shown at 96, so as to permit a lateral adjustment of the furrow wheel 94 with respect to a bracket 97. Formed integrally with the bracket 97 is a bearing barrel 98 which in turn is journaled on a shaft or pin 99. This shaft 99 is supported in a rearwardly extending portion 100 formed as an extension of the diagonal brace member 67. The other end of the pin is supported in a downwardly extending ear 101 formed integrally with the rearmost bracket 72. The depth penetration of the rear disks may be adjusted or controlled by a hand adjusting crank 102 which in turn, is rotatably mounted in a sleeve 103 pivoted in the bracket 104. The bracket 104 is secured in the bracket 97. The forward end of this crank shaft 102 is threaded and engages the telescopically threaded sleeve 63 for effecting the adjustable length of the connection between the sleeve bracket 57 and the crank bracket 97.

Summarizing the operation of our improved disk plow, let us assume that the plow or particularly the disks thereof are in their lowered or working position or the position shown in Fig. 2 and that the operator is desirous of lifting the disks out of the ground to the transporting position or the position shown in Fig. 3 of the drawings. To accomplish this, the operator pulls the rope or cord 91 forwardly and operatively connects the continuously driven clutch member 76 mounted on the inner end of the land wheel axle 64 so as to engage the intermittently driven clutch member 75, thereby driving the gear 54 by the pinion 74. It will be obvious that when the crank shaft 53 revolves through an angular distance of 180°, the land wheel 80 and axle 64 must complete a full revolution by reason of the gears 54 and 74 being in the ratio of two to one. When the crank 56 is revolved 180° it carries with it the sleeve 57, which in turn, moves the connection bar 42—60 rearwardly, thereby actuating the bell-crank 37 and raising the bracket 13 upwardly. The front end of the beam 10 is consequently raised upwardly about the parallel link connections previously described, to the dotted line position shown in Fig. 4 of the drawings. Simultaneously with this action, the connection 63—100 is moved rearwardly so as to actuate the bracket 97 about its pivot on the shaft 99 and depress the rear furrow wheel 94 with respect to the frame to thereby raise the plow at both ends by this simultaneous action. It will be observed that by reason of rigidly fastening the land wheel to the land wheel axle and supporting it in two spaced apart bearings, with the clutch mechanism between the bearings and spaced from the land wheel, that we have provided a very rigid and substantial construction and one in which the sand and dirt raised by the land wheel will be prevented from entering the clutch mechanism. The destructive wear by the sand and dirt on the clutch mechanism positioned adjacent the land wheel on the plows heretofore made has been eliminated by our construction.

It will also be observed that by reason of our parallel link arrangement for lifting the front end of the beam with respect to the front furrow wheel, we have provided a simple and efficient arrangement which requires less power to lift the front end of the plow than was required to lift the sliding axle type heretofore used.

While in the above specification we have described one embodiment which our invention may assume in practice, it will, of course, be understood that modification may be made without departing from the spirit and scope of the invention as expressed in the following claims.

What we claim as our invention and desire to secure by Letters Patent is:

1. A disk plow comprising a frame, front and rear furrow wheels supporting said frame and movable relatively thereto, an axle journaled on said frame, a land wheel secured to said axle, and power lift mechanism including a clutch carried by said frame and positioned a substantial distance inwardly from said land wheel and operatively connected with said axle and furrow wheels for raising and lowering said frame.

2. A disk plow comprising a frame, front and rear furrow wheels supporting said frame and movable relatively thereto, an axle journaled in widely spaced apart bearings, a land wheel secured to said axle, and power lift mechanism carried by said frame and operatively connected with said axle and furrow wheels for raising and lowering said frame.

3. A disk plow comprising a frame, front and rear furrow wheels supporting said frame and movable relatively thereto, a land wheel axle journaled in widely spaced apart bearings on said frame, a land wheel secured to said axle, and power lift mechanism including a clutch mechanism located adjacent the inner end of said axle and operatively connected with said furrow wheels for raising and lowering said frame.

4. A disk plow comprising a frame, front and rear furrow wheels supporting said frame, said furrow wheels adjustable relatively to said frame, widely spaced apart bearings carried by said frame, an axle journaled in said bearings, a land wheel secured to said axle, and a power lift clutch mechanism carried by said axle and located between said bearings and operatively connected to said furrow wheels for raising or lowering said plow.

5. A disk plow comprising a frame, front and rear furrow wheels supporting said frame, said furrow wheels adjustable relatively to said frame, widely spaced apart bearings carried by said frame, an axle journaled in said bearings, a land wheel secured to said axle, a power lift clutch carried by said axle positioned adjacent the inner end thereof and between said bearings, a crank shaft journaled on said frame and intermittently driven by said axle and operatively connected with said front and rear furrow wheels for raising and lowering said plow.

6. A disk plow comprising a frame, front and rear furrow wheels supporting said frame, said furrow wheels adjustable relatively to said frame, substantially widely spaced apart bearings carried by said frame, a continuously driven axle journaled in said bearings, a land wheel secured to the outer end of said axle, and a power lift clutch mechanism carried by said axle adjacent the inner end thereof and located between said bearings and operatively connected to said furrow wheels for raising or lowering said plow.

7. A disk plow comprising a frame, a furrow wheel supporting the front end of said frame, a furrow wheel supporting the rear end of said frame, means for pivoting said furrow wheels for substantial vertical adjustment with respect to said frame, a power lift for said plow including a land wheel axle journaled on said frame, a land wheel secured to said axle and rotatable therewith, a bearing for said axle carried by said frame and located adjacent said land wheel and a crank shaft geared to said land wheel axle and operatively connected to said furrow wheels for moving said furrow wheels relative to said frame for raising or lowering said plow.

8. A disk plow comprising a frame, front and rear furrow wheels supporting said frame, said furrow wheels adjustable relative to said frame, longitudinally adjustable spaced apart bearings carried by said frame, an axle journaled in said bearings, a land wheel rigidly secured to said axle, and a power lift mechanism including a clutch carried by and spaced a considerable distance inwardly from said land wheel, said clutch mechanism being operatively connected to said front and rear furrow wheels for raising and lowering said plow.

9. A disk plow comprising a frame, front and rear furrow wheels for supporting said frame, said furrow wheels being adjustable relative to said frame, parallel link mechanism forming the connections between one of said furrow wheels of said frame, a land wheel axle journaled in widely spaced apart bearings on said frame, a land wheel secured to said axle, and a power lift mechanism including a clutch spaced a considerable distance inwardly from said land wheel and operatively connecting the land wheel axle with said parallel link mechanism and the other of said furrow wheel, for raising and lowering said plow.

10. A disk plow comprising a frame, a furrow wheel supporting one end of said frame, a parallel link mechanism forming the adjustable connection between said furrow wheel and said frame, an axle journaled in widely spaced bearings on said frame, a land wheel secured to said axle adjacent one of said bearings, and power lift mechanism including a clutch located adjacent the other of said bearings and operatively connecting said land wheel axle with said power lift mechanism for raising and lowering one end of said frame.

11. A disk plow comprising a frame, a furrow wheel supporting one end of said frame, parallel link mechanism for adjustably connecting said furrow wheel with said frame, manual means operatively connected to said parallel link mechanism for regulating the depth penetration of the disks on the front end of said plow frame, a bell-crank associated with said parallel link mechanism, an axle journaled in widely spaced apart bearings on said frame, a land wheel secured to said axle, a clutch mechanism associated with said axle, a crank shaft operatively driven by said clutch mechanism and operatively connected to said bell-crank for raising and lowering one end of said plow.

12. A disk plow comprising a frame, a front furrow wheel adjustably supporting the front end of said plow frame, parallel link mechanism forming the adjustable connection between said furrow wheel and said frame, a manually operable lever operatively related to said parallel link mechanism for regulating the depth penetration of the disks on the front end of said plow frame, a bell-crank forming one of the links of said parallel link mechanism, an axle journaled on said frame, a land wheel secured to said axle, a crank shaft journaled on said frame and adapted to be operatively driven by said axle, and a connection extending from said bell-crank to said crank shaft for operatively connecting said axle with said furrow wheel for raising and lowering the front end of said plow.

13. A disk plow comprising a frame, a vertically adjustable furrow wheel connected to one end of said frame, a standard for pivotally connecting said furrow wheel with said frame, an adjustable sleeve slidably mounted on said standard, a hand lever mechanism mounted on said standard and connected to said sleeve for regulating the depth penetration of the disks on one end of said plow, a parallel link mechanism pivotally connected to said sleeve at one end and to said frame at the other end thereof, one of said links being in the form of a bell-crank, an axle journaled on said frame, a power lift clutch mechanism carried by said axle, a crank shaft mounted on said frame and adapted to be driven by said clutch mechanism, and operative connection between said bell-crank and said crank shaft for vertically adjusting one end of said plow frame.

14. A disk plow comprising a frame, a front furrow wheel adjustably connected to said frame, a vertical standard for pivotally connecting said furrow wheel with said frame to permit said furrow wheel to guide said plow, a slidable and adjustable sleeve mounted on said standard, a parallel link mechanism having one end thereof pivotally connected to said sleeve and the other end thereof pivotally connected to said frame, a bell-crank forming one of the links in said parallel link mechanism, an axle journaled on said frame, a land wheel secured to said axle, a power lift mechanism including a clutch carried by said axle and spaced from said land wheel, said clutch including a continuously driven member and an intermittently driven member, a gear formed integrally with said intermittently driven member, a crank shaft journaled below said axle and having a pinion secured thereto and meshing with the gear of said intermittently driven clutch member, an adjustable connection between said bell-crank and said crank shaft, and a hand operating lever operable from the tractor seat and carried by said standard and operatively connected to said sleeve for regulating the depth penetration of the disk on the front end of the plow.

15. A disk plow comprising a frame, front and rear wheels for supporting said frame, axles for connecting said wheels to said frame, spaced apart disks carried by said frame, parallel link mechanism forming the connections between one of said wheels and said frame, means mounted on one of said axles for manually adjusting said parallel link mechanism with respect to one of said wheels for varying the depth penetration of said disks into the ground, and a power lift mechanism associated with said plow and operatively connected to said parallel link mechanism for raising and lowering one end of said plow frame.

16. A disk plow comprising a frame, front and rear furrow wheels for supporting said frame, axles for connecting said wheels to said frame, a parallel link mechanism connecting one of said furrow wheels with said axles, means mounted on said last named axle for manually adjusting said last named furrow wheels with respect to said parallel link mechanism, a land wheel for said frame, and power lift mechanism operatively driven by said land wheels and operatively connected to said parallel link mechanism for raising one end of said frame with respect to the ground.

17. A disk plow comprising a frame, front and rear furrow wheels and land wheels supporting said frame, disks carried by said frame, axles forming the connections between said wheels and said frame, a parallel link mechanism connecting one of said furrow wheels to one of said axles, manually operable means mounted on said last named axle for adjusting said parallel link mechanism with respect to said last named furrow wheel for controlling the depth penetration of the disks at one end of said plow, and a power lift mechanism driven by said land wheel and operatively connected with each of said furrow wheels for raising and lowering said plow.

18. A disk plow comprising a frame, a furrow wheel connected to one end of said frame, a standard pivotally connecting said furrow wheel with said frame, an adjustable sleeve slidably mounted on said standard, a hand operated mechanism mounted on said standard and connected to said sleeve for regulating the depth penetration of the disks on one end of said plow, a parallel link mechanism pivotally connected to said sleeve at one end and to said frame at the other end thereof, a crank associated with said parallel link mechanism, and a power lift clutch mechanism associated with said frame and connected with said crank for vertically raising one end of said plow frame.

19. A disk plow comprising a frame, a furrow wheel connected to one end of said frame, a standard pivotally connecting said furrow wheel with said frame, an adjustable sleeve slidably mounted on said standard, a hand operated mechanism mounted on the upper end of said standard and connected to said sleeve for regulating the depth penetration of the disks on one end of said plow, a parallel link mechanism pivotally connected to said sleeve at one end and to said frame at the other end thereof, a crank associated with said parallel link mechanism, an adjustable furrow wheel supporting the other end of said frame, a land wheel for said frame, and a power lift clutch mechanism associated with said land wheel and operatively connected to said crank and to said last named furrow wheel for raising and lowering said plow frame.

20. A disk plow comprising a frame, a front furrow wheel connected to said frame, a vertical standard pivotally connecting said furrow wheel with said frame to permit said furrow wheel to guide said plow, a slidable and adjustable sleeve mounted on said standard, a parallel link mechanism having one end pivotally connected to said sleeve and the other end thereof connected to said frame, a crank associated with said parallel link mechanism, an axle carried by said frame, a land wheel mounted on said axle, a power lift mechanism associated with and operatively driven by said land wheel, operative connections between said power lift mechanism and said crank for raising and lowering one end of said plow frame, and hand operative lever mounted on and adjacent the top of said standard and connected to said sleeve for regulating the depth penetration of the disks on the front end of the plow.

RUDOLPH J. ALTGELT.
CAMERON H. GEMBERLING.